June 5, 1934.  E. GRANAT  1,962,070
SHIP'S LOG
Filed May 15, 1933  2 Sheets-Sheet 1
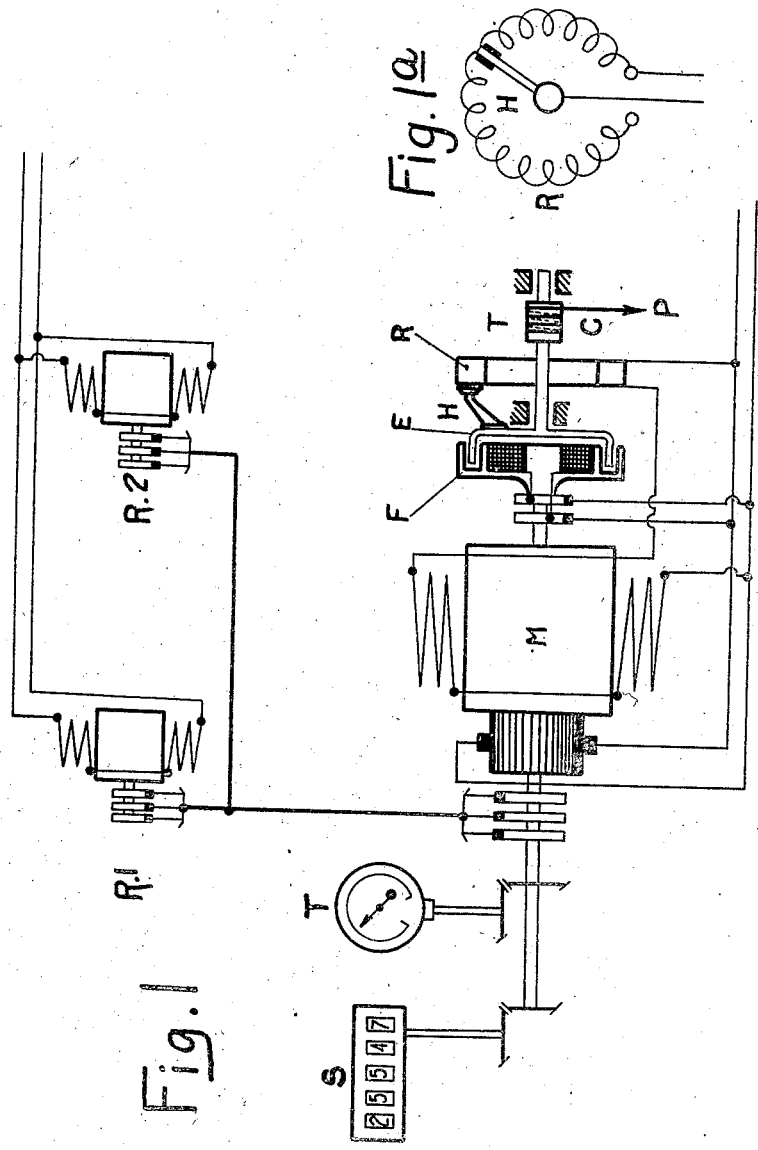

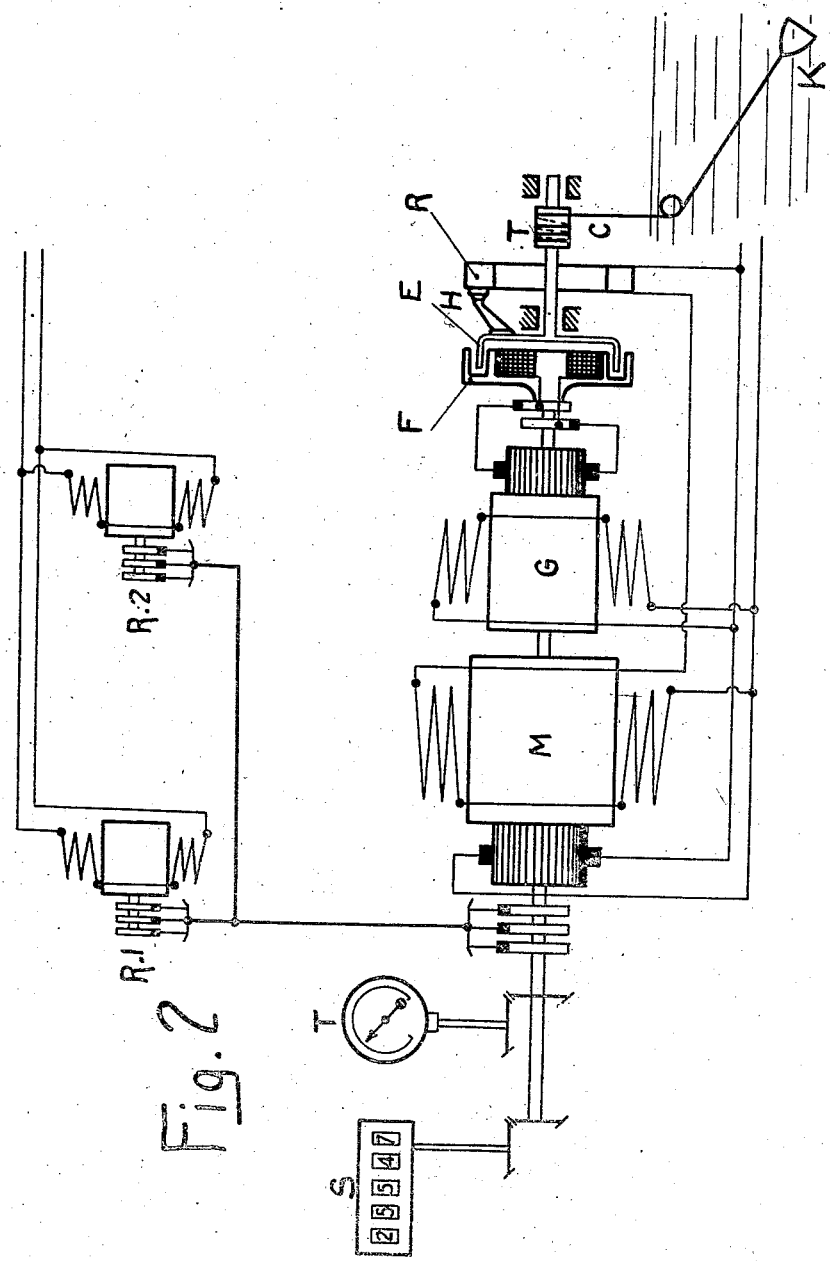

Patented June 5, 1934

1,962,070

UNITED STATES PATENT OFFICE 1,962,070

SHIP'S LOG

Elie Granat, Paris, France, assignor of one-half to Compagnie des Forges et Acieries de la Marine et d'Homecourt, Paris, France, a company of France Application May 15, 1933, Serial No. 671,236
In France June 4, 1932

3 Claims. (Cl. 73—122)

My invention has for its object an electric dynamometer for measuring a force exerted by a pressure, a tractional effort, a frictional resistance or the like, the dynamometer balancing this force, which is caused to act on a winch or any other equivalent system, by means of a motor which is constrained to rotate at a speed depending on the applied force or pressure and to move the winch against the force; equilibrium is obtained by means of an electromagnetic inductive coupling interposed between this motor and the winch on which the force to be measured acts.

This inductive coupling is fed by a supply which produces a flux which either is constant or else depends on the speed of the motor; in the first case the torque provided by the flux is proportional simply to the speed of the motor while in the second case the torque is proportional both to the speed of the motor and to the flux in the coupling; this allows the torque in all cases to be rendered proportional to the force to be equilibrated; in particular the flux may itself be proportional to the speed of the motor and consequently the torque acting on the winch against the force to be measured is then proportional to the square of the speed of the motor.

The adjustment of the speed of the motor controlling the electromagnetic coupling is obtained in the following manner: The coupling comprises a part integral with the winch which is normally stationary when the latter is held in equilibrium, but which may be shifted through a certain angle, said part being adapted to be driven inductively by the movable part of the coupling integral with the control motor.

This normally stationary part of the coupling acts as it moves on a device adjusting the speed of the motor; for instance in the case of an electric motor, it moves a slide over a stationary resistance, the variations of which act on the speed of the driving motor in the direction adapted to restore equilibrium.

This equilibrium corresponds for a given force to be balanced and a given flux in the electromagnetic coupling, to a well defined speed of the motor. The speed of the motor may thus serve for measuring the force to be studied; if this latter is variable, the speed of the motor varies in a continuous manner in the same direction as the force.

This latter feature has the interest of allowing the integration of the different values of the force in function of time. It is sufficient therefor to totalize the number of revolutions of the motor. The totalizer used therefor may moreover be controlled either directly by the motor or at a distance by means of an electric synchronous transmission.

For the measuring of the instantaneous force itself, it is sufficient to have an instantaneous speed indicator; also controlled by the motor either directly or at a distance, by means of a synchronous electric transmission.

My invention is particularly applicable to the measuring of the speed of ships, by means of a towed log constituted by a suitably shaped immersed solid body.

In logs of this type, the tractional force exerted on the cable supporting the immersed body is proportional to the square of the speed of the ship; this force may be applied through the winch to the part of the electromagnetic coupling integral with the winch and is then measured as explained hereinabove. In this case it is necessary to produce a driving torque proportional to the square of the speed of the ship; the speed of the motor will then be proportional to the speed of the ship. For obtaining a driving torque thus proportional to the square of the speed, it is sufficient, as explained hereinabove, to make the driving flux in the coupling vary proportionally to the speed of the motor. This may be obtained, of instance, by feeding the coupling from a constant excitation dynamo controlled by the driving motor and the voltage and consequently the output of current of which will be directly proportional to the speed. The speed of the driving motor read on a speed indicator of any type suitably graduated, will give thus directly the value of the speed to be measured.

In the particular case of adaptation to a log giving out the speed of a ship, this arrangement would allow the integration of the speed to be effected i. e. it would be possible to give out at every moment the value of the distance travelled. It would be sufficient therefor to totalize the number of revolutions made by the driving motor by means of a totalizer controlled by the motor either directly or from a distance by means of a synchronous transmission.

I have illustrated in appended drawings and by way of example two forms of execution of the invention.

Fig. 1 relates to an application to the measuring of any force.

Fig. 1ᵃ is a diagrammatic front view of the variable resistance device associated with the field winding of the motor.

Fig. 2 shows an adaptation to a towed log for measuring the speed of a ship.

Referring to Fig. 1, the force to be measured P acts on a cable C wound over a winch T integral with the cup shaped part E of soft iron of an electromagnetic inductive coupling; the cooperating movable part F of the clutch contains a coil energized from the D. C. mains and is driven by the motor M also fed from the constant voltage direct current mains.

In the example illustrated, the motor M is of the shunt type; its field winding is fed through the agency of the variable stationary resistance R over which moves the rubbing part H integral with the winch part E of the electromagnetic clutch.

The motor shaft controls on the other hand, a tachometer T and a totalizer S giving out respectively the speed of the motor, i. e. the force to be measured and the integration of these values during a given time.

The motor M may also be provided with three rings according to my prior Patent No. 1,883,711 granted Oct. 18, 1932. The motor thus constituted acts as a transmitter for distance control for actuating synchronous receivers such as $R_1$, $R_2$.

The arrangement for adjusting the speed of the motor to a value proportional to the force to be measured is as follows; supposing equilibrium is reached between the driving torque and that produced by the force P, the winch and part E will remain stationary; if P varies, part E will be shifted and the slider H will move over the resistance R which provides an increase or a reduction in the speed of the motor according to the case until equilibrium is again reached. Henceforward the speed of the motor will remain constant as long as the force P does not vary.

It should be noted that the angular distribution of the resistances on the rheostat R has no importance as concerns the regulation of the speed as the system will be in equilibrium only when the speed of the motor has reached the value corresponding to a driving torque equal to the torque produced by the force P. For the same reason, the variation in resistance of the field pieces of the motor M has also no importance, as it is compensated by a complementary shifting of the slider H with reference to the rheostat R until equilibrium is reached.

The arrangement of Fig. 2 relates to the application of the system to a towed log for the direct determination of the speed of the ship as well as that of the distance travelled.

The arrangement comprises beyond the parts shown in Fig. 1 a generator G the armature of which, keyed to the shaft of motor M, feeds the excitation winding of the inductive coupling.

This excitation winding being fed from the constant voltage mains, the flux generated in the electromagnetic clutch is proportional to the voltage of the generator, i. e. to the speed of the motor.

The torque of the electromagnetic clutch is thus proportional together to the flux in the clutch and to the speed and therefore to the square of this speed.

On the other hand, the suitably-shaped towed body K, the resistance of which to the frictional action of the water is proportional to the square of the speed of the ship, acts on the winch T through the cable C.

When the two antagonistic forces are in equilibrium there is a proportionality between the squares of the speeds of the motor M and of the ship towing the log K, i. e. between these two speeds themselves.

The speed of the motor M being thus proportional to that of the ship, it is sufficient to use as in the case of Fig. 1, a speedometer T and a totalizer S of the number of revolutions.

Of course, the indications may be read at a distance by means of the arrangements provided in Fig. 1. In particular, one of the controlled receivers such as $R_1$, may control a track chart or any other apparatus the working of which depends on the distance travelled.

What I claim is:

1. An electric dynamometer for measuring a force comprising a two part electromagnetic inductive coupling, means whereby the force to be measured acts on one part of the coupling, a motor driving the other part in a direction opposed to the action of the force, means controlled by the displacements of the first part of the coupling for adjusting the speed of the motor and thereby varying its torque to a value equal to that of the torque produced by the force to be measured and means for measuring the speed of the motor.

2. A device for measuring the speed of a vessel comprising a log towed by the vessel and submitted to a resistance proportional to the square of the vessel's speed, a cable connected with the log, a winch over which the cable is wound, a two-part inductive coupling one part of which is integral with the winch, a motor adapted to drive the second part of the coupling in a direction opposed to the action of the log and cable on the winch, means for producing in the coupling a flux proportional to the speed of the coupling driving motor, means controlled by the displacements of the first part of the coupling for adjusting the speed of the motor and thereby varying its torque to a value equal to that of the torque produced by the log and means for measuring the speed of the motor.

3. A device for measuring the speed of a vessel comprising a log towed by the vessel and submitted to a resistance proportional to the square of the vessel's speed, a cable connected with the log, a winch over which the cable is wound, a two-part electromagnetic inductive coupling one part of which is integral with the winch, an electric motor adapted to drive the second part of the coupling in a direction opposed to the action of the log and cable on the winch, a current generator driven by the motor and feeding the coupling with a current producing a flux proportional to the speed of the motor, a stationary rheostat controlling the speed of the motor, a slider cooperating with the rheostat carried by the first part of the coupling and a tachometer controlled by the motor.

ELIE GRANAT.